United States Patent [19]

Giardini

[11] 4,197,996
[45] Apr. 15, 1980

[54] CONSTANT PRESSURE FUEL INJECTOR ASSEMBLY

[75] Inventor: Dante S. Giardini, Dearborn Heights, Mich.

[73] Assignee: Ford Motor Company, Dearborn, Mich.

[21] Appl. No.: 967,553

[22] Filed: Dec. 7, 1978

[51] Int. Cl.² ............................................ F02M 49/02
[52] U.S. Cl. .............................. 239/87; 123/139 AJ; 239/585; 251/139
[58] Field of Search .......... 239/87, 453, 533.2–533.12, 239/585; 251/139, 141; 123/32 JV, 139 AJ

[56] References Cited
U.S. PATENT DOCUMENTS 2,332,909  10/1943  Fuscaldo ............................. 251/139
3,081,758   3/1963  May ..................................... 239/87 X

*Primary Examiner*—Andres Kashnikow
*Attorney, Agent, or Firm*—Robert E. McCollum; Clifford L. Sadler

[57] ABSTRACT

FIG. 1 shows a fuel injector having a valve 54 that closes an outlet 50 in a housing 10 by means of a spring 22, excitation of a magnet 14 opening the valve; the injector has a toroidal chamber 62 containing an annular piston 66 subject to combustion chamber pressures on one side or end by means of a vent 72 and filled with fuel acting against its opposite side, a spring 70 biasing the piston to charge the piston chamber or reservoir 80 with a pressure equal to the pressure of the fuel passing through inlet check valve 38 connected to reservoir 80.

8 Claims, 2 Drawing Figures

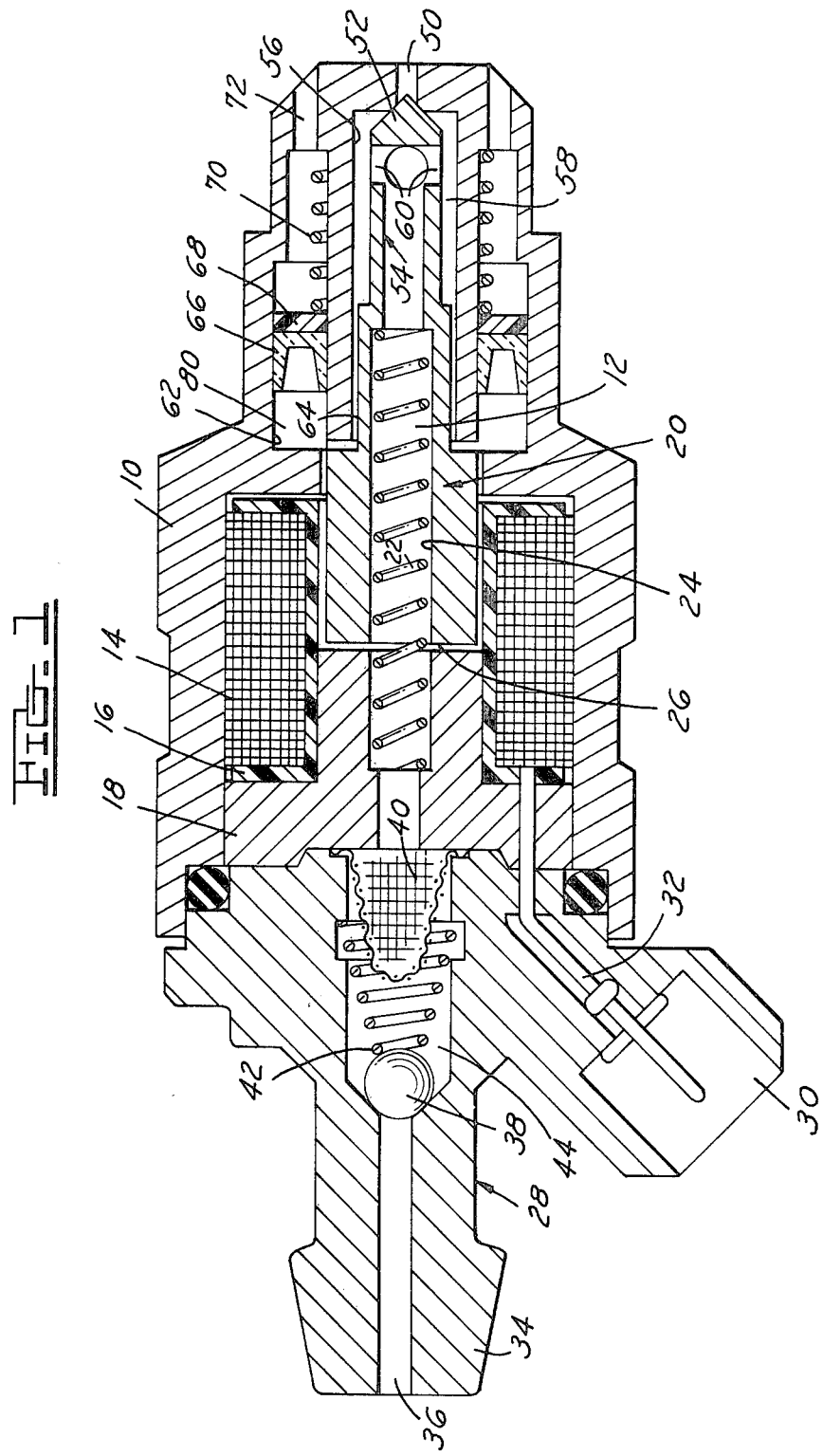

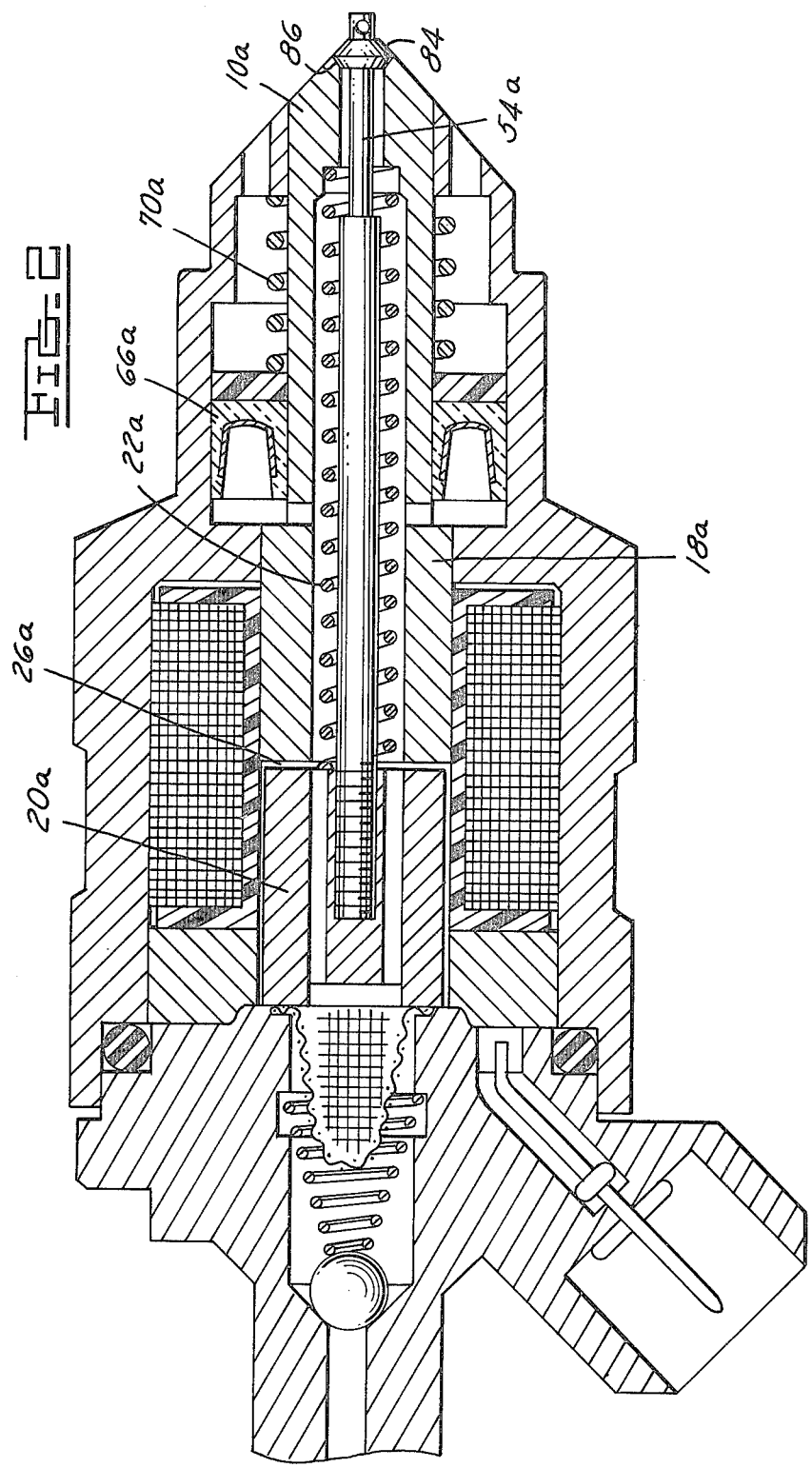

CONSTANT PRESSURE FUEL INJECTOR ASSEMBLY

This invention relates in general to an internal combustion engine fuel injection assembly. More particularly, it relates to the construction of a fuel injector assembly that injects the fuel charge at essentially a constant pressure regardless of the variations in engine combustion chamber pressures above a predetermined level.

Electromagnetically actuated fuel injection valves or fuel injectors are known especially in diesel engine applications for injecting oil, usually at high pressures, into the combustion chamber of an internal combustion engine. This requires a high pressure pump and generally elaborate control means to regulate the fuel pressure to the injector for subsequent ejection. This invention relates to a low pressure fuel injector that is simple in construction and contains few parts while at the same time providing essentially a constant low injection pressure regardless of the magnitude to which the combustion chamber pressure increases. This is accomplished in the invention by the use of a fuel reservoir that is pressurized to the level of the combustion chamber plus the force of a charging spring, and is so constructed and arranged that the fuel pressure and combustion chamber pressures will be balanced permitting the fuel to be injected at a pressure level determined solely by the force of the spring. Therefore, essentially a constant charge injection pressure is provided regardless of the increase in combustion chamber pressures above a predetermined level.

Fuel injectors of the general type described above are known. For example, U.S. Pat. No. 2,332,909, Fuscaldo, Fuel Injection Valve Apparatus, proports to disclose a fuel injector having a fuel charging piston in FIG. 3 with differential areas subjected, respectively, to combustion chamber pressures and fuel pressures to inject a predetermined quantity of fuel into the combustion chamber at essentially a constant pressure level upon the excitation of a magnetic coil 13. However, the device of Fuscaldo fails to provide the compactness of this invention, a differential area piston is required, the piston structure is offset to one side of the injector and, therefore, not incorporated to be symmetrically arranged with respect to the injector; furthermore, there is no inlet check valve on the pressure source of Fuscaldo but reliance is made upon movement of the piston smaller diameter to cut off the fuel source prior to pressurization, and the fuel leak rate is high. Furthermore, the fuel charge pressure is not determined by the spring of Fuscaldo as will become apparent upon a consideration of this invention, and only one flow rate is possible since the piston cuts off the fuel to thereafter pressurize the fuel chamber.

It is, therefore, a primary object of this invention to provide a fuel injector assembly that is compact in construction and utilizes balanced area fluid pressure actuated or responsive means in cooperation with a spring to provide essentially a constant fuel charge pressure for injection into the engine combustion chamber.

It is a further object of the invention to provide a fuel injector assembly that includes an electromagnet assembly having a movable armature formed on one end and constituting a valve member adapted to seat in a fuel outlet orifice or nozzle to block the same until energization of the magnetic coil withdraws the armature and valve; and annular fluid pressure means coaxially surrounding the fuel injection valve to be subjected to fuel pressure on one side and combustion chamber pressure on the opposite side with a spring biasing the fluid pressure means in a direction to increase fuel pressure, whereby opening of the injector valve effects a balance of pressures on opposite sides of the fluid pressure means to permit the force of the spring to inject the fuel into the combustion chamber at the force level of the spring.

Other objects, features and advantages of the invention will become more apparent upon reference to the succeeding detailed description thereof, and to the drawings illustrating the preferred embodiments thereof; wherein, FIG. 1 is a cross-sectional view of a fuel injector assembly embodying the invention; and, FIG. 2 is a view similar to FIG. 1 illustrating a modified embodiment of the invention.

FIG. 1 shows a fuel injector assembly that includes a steel outer housing or shell 10 providing a hollow interior defining a central axially extending bore 12. Received within the housing is an electromagnet assembly that includes a conventional magnetic coil 14 mounted upon an annular spool 16 supported upon a soft iron magnetic core member 18. The core is axially aligned with an axially movable armature pintle or plunger 20 also partially received within the coil 14. Armature 20 and magnetic core 18 are biased apart by a spring 22 to define an air gap 26, the spring being seated in a recess 24 provided in the two members. Energization or excitation of magnetic coil 14 causes an attraction of the armature 20 towards core 18 to close the gap 26, in a known manner.

The coil 14 is connected to a source of electrical energy by an adapter 28 sealingly secured to the left end (as seen in FIG. 1) of the housing 10, by means not shown, and against magnetic core 18, as shown. The adapter has a plug in socket 30 with an electrical connection 32 to coil 14 as shown. The adapter also has a fuel inlet nipple 34 with a central passage 36. Passage 36 is connected to bore 12 past a one-way check valve 38 and through a filter screen 40. Check valve 38 is seated against a conically formed end of passage 36 by a spring 42 seated at its opposite end on a shoulder formed in an enlarged fuel inlet chamber 44. The fuel in conduit 36 is supplied thereto from any suitable fuel pump having a pressure regulator for delivering the fuel at a pressure level of between 10–80 psi, for example.

The right hand side of steel housing 10 has a fuel outlet orifice or nozzle 50. The nozzle is adapted to receive the pointed end 52 of a fuel injector control valve 54 that is formed integral on one end of the armature plunger 20. The valve in this case is an inwardly opening valve, as indicated, and has a reduced diameter end portion defining between it and an internal diameter portion 56 of housing 10 a fuel flow chamber 58. Chamber 58 communicates with the fuel in the bore 12 through a number of transverse openings 60.

Also provided in the housing is a toroidal-like recess 62 that surrounds the fuel injection control valve 54. It is connected to fuel chamber 58 at one end of recess 62 by the space 64 provided between an outer diameter of the armature plunger 20 and the internal diameter 56 of the housing. Axially slidably mounted in the recess is an annular cup-shaped graphite ceramic type piston 66 that is essentially friction free to move easily in either direction in the recess. An insulating disc 68 also serves as a seat for a charging spring 70. The recess 62 communicates at its rightward end, as seen in FIG. 1, through an annular vent opening 72, to the pressure of the engine combustion chamber. The injector 54 in this case would be adapted to be inserted into the combustion chamber of an engine for direct injection of fuel into the cylinder.

OPERATION

As stated previously, a primary object of the invention is to provide a compact fuel injection assembly construction that is electromagnetically actuated to provide essentially a constant charge pressure to the fuel injected into the engine and at a low pressure level that is essentially unaffected by the changes in combustion chamber pressure levels.

In the unexcited or unenergized state of magnetic coil 14, the armature spring 22 will separate the armature plunger 20 from the magnetic core 18 to seat the valve end 52 in the outlet orifice or nozzle 50 and block injection of fuel into the combustion chamber. When the engine is operating on its intake or induction stroke, the combustion chamber pressures will be subatmospheric allowing the fuel pressure acting against check valve 38 to unseat the same against the force of spring 42 and fill the central cavity or bore 12. This fuel flow will also fill the reservoir, i.e., the fuel charging portion 80 of recess 62 on the left side of piston 66 through connecting holes 60 and chamber 58 to move the piston rightwardly against the force of spring 70 until the fuel pressure in chamber 80 balances the force of spring 70. At this point, the inlet check valve 38 will close and the fuel will be trapped in the various cavities.

As soon as the engine rotates through the induction stroke and proceeds into the compression stroke, the build-up of combustion chamber pressure will be sensed through vent 72 against the right side of piston 66 and will move the piston leftwardly upon continued rise in the combustion chamber pressure until the fuel pressure in fuel charge chamber 80 equals the combustion chamber pressure level plus the force of spring 70. Assume now that coil 14 is energized or excited for a predetermined time interval to inject a predetermined quantity of fuel, such as 80 millileters, for example, into the combustion chamber. The armature plunger 20 is moved leftwardly to close the air gap 26 and to open the valve. Immediately, fuel will be injected to the nozzle 50 at a pressure level equal to that of the force of spring 70 since the differential pressure acting on the piston will be that due to the spring 70. The amount of travel of the piston 66 will be very small, such as 0.0025 inches, for example. Therefore, the force of spring 70 will be decayed by only a very small amount, if any, resulting in an essentially constant pressure fuel delivery. As soon as the timed duration of injection is over, the magnetic coil 14 will be de-energized allowing spring 22 to again seat control valve 54 in the outlet orifice 50. Once again, upon decay of the combustion chamber pressure to a level below that of the force of spring 70, the inlet check valve 38 will open and refill or reprime the fuel passages, bores and recesses.

From the above, it will be seen that the piston 66 sees equal pressure levels on opposite sides and that, therefore, the fuel is injected at a force level determined solely by that of the spring 70 and the inlet pressure level of the fuel.

FIG. 2 shows an alternate construction for an outwardly opening control valve 54A. In this case, the positions of the magnetic core 18A and the armature plunger 20A are reversed since the armature plunger in this case will move in the direction opposite to that shown in FIG. 1. A spring 22A again biases the armature and core apart to provide the air gap 26A. The valve 54A in this case has a semi-spherical surface 84 that is adapted to seat against a mating or conically formed surface 86 on the valve housing 10A. The remaining parts and operation of the injector assembly shown in FIG. 2 are the same as those in FIG. 1 and, therefore, will not be repeated. Again, excitation of the magnetic coil 14 moves open the valve 54A causing a timed injection of fuel into the combustion chamber at a pressure level determined solely by the force of spring 70A since the fluid pressure level on opposite sides of piston 66A are balanced.

While the invention has been shown and described in its preferred embodiments, it will be clear to those skilled in the arts to which it pertains that many changes and modifications may be made thereto without departing from the scope of the invention. For example, while the spring 70, 70A has been illustrated as a compression spring located in the chamber to the right of piston member 66, 66A in FIGS. 1 and 2, respectively, the spring could equally be located on the opposite side of piston 66, 66A in the fuel charging chamber 80, 80A so as not to subject the spring to the high temperatures of the combustion chamber. In this case, the spring would be a tension spring to be stretched by the fuel pressure during the intake stroke, to provide an overall operation corresponding to that previously described.

I claim:

1. A constant pressure fuel injector for use in the combustion chamber of an internal combustion engine comprising an outer housing having a control bore and a fuel outlet orifice, a fuel flow control valve axially movable to block or permit fuel flow through the orifice, an electromagnet assembly within the housing including a coil and an armature secured to the valve, spring means urging the armature and valve to a first position closing the orifice, the valve being movable to a second position opening the orifice upon energization of the coil, fuel containing conduit means connected to the bore and having a one-way check valve in the conduit means opening to permit an inflow of fuel and closing to permit a buildup of pressure in the bore in the first closed position of the control valve, a fuel pressure charging chamber coaxially surrounding the bore, means connecting one end of the charging chamber to the bore and the opposite end to the combustion chamber pressure, a fluid pressure responsive means in the charging chamber movable by combustion chamber pressure to raise the fuel pressure on the bore side of the charging chamber to the combustion chamber pressure levels, and spring means in the charging chamber urging the fluid pressure means in a direction to increase fuel pressure to a charge level at which the fuel is injected through the orifice upon opening of the valve to its second position regardless of the increase in combustion chamber pressure level.

2. A fuel injector as in claim 1, the fluid pressure means comprising a toroidal shaped piston surrounding the control valve.

3. A fuel injector as in claim 1, the control valve having a needle-like shape to seat in the orifice.

4. A fuel injector as in claim 1, the orifice including a conical valve seat, the control valve comprising an outwardly opening valve having a semi-spherically shaped end adapted to seat on the valve seat.

5. A constant pressure fuel injection valve assembly for insertion into the combustion chamber of an internal combustion engine comprising an outer housing having a central bore, a magnetic winding assembly in the bore having a core axially aligned with a movable armature, spring means biasing the core and armature apart to define an air gap, a magnetic coil surrounding portions of the core and armature when energized effecting axial movement of the armature to close the gap, the housing being closed at one end and having a valve seat type opening at the one end normally closed by a valve connected to the armature and movable from the closed position to an open position to open the opening upon movement of the armature to close the gap, a control chamber having movable fluid pressure responsive means therein dividing the control chamber into a fuel containing portion for moving the pressure responsive means in one direction and a combustion chamber communicating portion for moving the fluid pressure responsive means in the opposite direction in response to combustion chamber pressures acting thereon, a spring urging the fluid pressure responsive means in the opposite direction, a fuel conduit adapted to contain fuel under pressure connected both to the housing opening and to the fuel containing portion of the control chamber, and one-way check valve means in the fuel conduit for controlling the supply of fuel to the opening and to the control chamber portion and the backpressure buildup of fuel, the housing having a second vent opening connected to the combustion chamber communicating portion to subject the latter portion to the varying combustion chamber pressure levels, the force of he spring being less than the pressure level of the fuel upstream of the check valve whereby subjection of the vent opening to low combustion chamber pressure levels when the valve is in a closed position effects the inflow of fuel to the chamber to overcome the spring force and move the fluid pressure means to fill the control chamber fuel portion with fuel to a charge level, elevation of the combustion chamber pressure to a predetermined level closing the check valve and moving the fluid pressure responsive means to increase fuel pressure to a higher level equal to the combined force of the spring and the combustion chamber pressure, movement of the valve to an open position upon energization of the coil effecting the injection of fuel into the combustion chamber at an essentially constant pressure level equal to the force of the spring.

6. A compact constant charge pressure fuel injection valve assembly for insertion into the combustion chamber of an internal combustion engine comprising an outer closed housing having a central axially extending bore connected at one end to a source of fuel under pressure and at its other end connected to an outlet orifice in the housing, one-way check valve means in the one end opened at times to provide an inflow of fuel to the bore and closed at other times to permit a buildup in fuel pressure, a fuel flow control valve slidably mounted in the bore for an axial movement between a closed position engaging the outlet orifice to block the same and an open position unblocking the orifice to permit the injection of fuel therethrough, an electromagnet assembly received within the housing surrounding a portion of the control valve and spaced therefrom to define a fuel flow passage in the bore from the one end to the outlet orifice and including a magnetic core axially aligned with a movable armature secured to the control valve, spring means biasing the core and armature apart to provide an air gap therebetween and biasing the armature and control valve to a closed position, a magnetic coil surrounding the core and armature when energized moving the armature to close the gap and move the control valve to an open position, the housing having a toroidal-like recess surrounding the control valve connected to the fuel flow passage at one end and being open to the engine combustion chamber at its other end, an axially movable piston in the recess movable in response to the differential pressures of the fuel flow and combustion chamber pressure levels acting on opposite sides to pressurize the fuel flow passage to the level of the combustion chamber, and a spring in the recess biasing the piston in a direction to increase the fuel pressure to an essentially constant charge pressure level when the control valve and check valve are closed, whereby the fuel is injected through the orifice into the combustion chamber upon opening of the control valve at the charge pressure level at all times regardless of the rises in combustion chamber pressure levels above a predetermined value, reduction of the combustion chamber pressure below the predetermined level permitting opening of the check valve to move the piston by fuel pressure against the force of the spring to increase the fuel pressure in the passage to the charge pressure level.

7. A fuel injector as in claim 6, the control valve being an inwardly opening valve having a conical-like tip engageable in the outlet orifice to close the same.

8. A fuel injector as in claim 6, the control valve being an outwardly opening valve whereby combustion chamber pressure acting on the valve urges it to a closed position, the control valve having a conical-like end mating with a similarly formed seat in the portion of the housing defining the outlet orifice.

* * * * *